United States Patent
Patta et al.

(10) Patent No.: US 12,505,398 B2
(45) Date of Patent: Dec. 23, 2025

(54) LOCATION BASED SYSTEM AND METHOD FOR EMERGENCY RESPONSE IN OIL AND GAS INDUSTRY

(71) Applicant: SAUDI ARABIAN OIL COMPANY, Dhahran (SA)

(72) Inventors: Fawaz Kadannam Patta, Dhahran (SA); Faisal Yousef Alhammad, Dammam (SA); Nazir Muhammad Puthukattu, Dhahran (SA); Ehab M. Moaibed, Dhahran (SA); Zahra Jaffar Almadan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 346 days.

(21) Appl. No.: 18/305,773

(22) Filed: Apr. 24, 2023

(65) Prior Publication Data

US 2024/0354679 A1    Oct. 24, 2024

(51) Int. Cl.
- *G06Q 10/0635* (2023.01)
- *G06Q 10/0631* (2023.01)
- *G06Q 50/06* (2012.01)

(52) U.S. Cl.
CPC ... *G06Q 10/0635* (2013.01); *G06Q 10/06313* (2013.01); *G06Q 50/06* (2013.01)

(58) Field of Classification Search
CPC ......... G06Q 10/0635; G06Q 10/06313; G06Q 50/06
See application file for complete search history.

(56) References Cited

U.S. PATENT DOCUMENTS

| | | | |
|---|---|---|---|
| 4,594,537 A * | 6/1986 | Arifian | G05D 1/0077 318/632 |
| 10,834,482 B2 | 11/2020 | Speicher et al. | |
| 11,146,680 B2 | 10/2021 | Leavitt et al. | |
| 2014/0320296 A1 * | 10/2014 | Thurber | G08B 21/14 340/632 |
| 2015/0000374 A1 * | 1/2015 | Romanak | G01N 33/0004 73/23.35 |
| 2019/0174208 A1 * | 6/2019 | Speicher | G06F 1/163 |
| 2020/0334605 A1 | 10/2020 | Yan | |
| 2021/0166143 A1 | 6/2021 | Bloomquist et al. | |

FOREIGN PATENT DOCUMENTS

| | | |
|---|---|---|
| CN | 101369152 A | 2/2009 |
| CN | 105701322 A | 6/2016 |
| CN | 105719052 A | 6/2016 |

\* cited by examiner

*Primary Examiner* — Kathy W Wang-Hurst

(74) *Attorney, Agent, or Firm* — Osha Bergman Watanabe & Burton LLP

(57) ABSTRACT

A system for emergency planning and response to an incident related to the oil and gas industry comprising one or more databases that store data of oil spills and trajectories models, real-time locations of emergency vehicles, H2S gas sensors, LEL gas sensors, and corrosion pumps real-time readings, real-time weather stations, gas wells cross sections drawings and locations of daily drilling rigs. The system further comprises ERP, satellite imagery or aerial photography, and AVL; one or more servers; an ERP system; an electronic display device; and a GIS. The GIS comprises a processing system, and a GIS map displayed by the electronic display device. The GIS map is configured to display a common operating visual of the incident to incident personnel as it unfolds and to locate the emergency vehicles near to the incident.

20 Claims, 11 Drawing Sheets

LOCATION BASED SYSTEM AND METHOD FOR EMERGENCY RESPONSE IN OIL AND GAS INDUSTRY

BACKGROUND

Emergency planning and response (EPR) for incidents related to the oil and gas industry encompass a wide range of activities. All stages of the EPR depend on data from a variety of databases. The correct data must be gathered, organized, and displayed logically to determine the size and scope of the incident and to take the appropriate response. Without a centralized mechanism where all departments of a company share information through the databases on a single map, the incident personnel must gain access to several department managers, their maps, and their data. This may result in the incident personnel having to guess, estimate, or make decisions without the adequate information. This may also cost time, money, and lives. Accordingly, there is a need for a mechanism to centralize and visually display critical information during an emergency for incidents related to the oil and gas industry.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a system for emergency planning and response to an incident related to the oil and gas industry. The system comprises one or more databases that store data of oil spills and trajectories models, real-time locations of emergency vehicles, hydrogen sulfide (H2S) gas sensors, lower explosive limit (LEL) gas sensors, and corrosion pumps real-time readings, real-time weather stations, gas wells cross sections drawings and locations of daily drilling rigs. The system further comprises enterprise resource planning (ERP), satellite imagery or aerial photography, and automatic vehicle location (AVL); one or more servers operatively connected to the one or more databases; an ERP system operatively connected to the one or more servers; an electronic display device operatively connected to the one or more servers; and a Geographical Information System (GIS), wherein the GIS is operatively connected to the one or more servers. The GIS comprises a processing system, and a GIS map displayed by the electronic display device. The GIS map is configured to display a common operating visual of the incident to incident personnel as it unfolds and to locate the emergency vehicles near to the incident.

In general, in one aspect, embodiments disclosed herein relate to a method for emergency planning and response to an incident related to oil and gas industry, the method comprising: reporting the incident via a communication interface; gathering essential data about the incident stored in one or more databases, wherein the essential data comprises oil spills and oil spill trajectories, real-time locations of emergency vehicles, hydrogen sulfide (H2S) gas sensors real-time readings, lower explosive limit (LEL) sensors real-time readings, corrosion pumps real-time readings, real-time weather stations data, gas wells cross sections drawings and locations of daily drilling rigs, enterprise resource planning (ERP) data, satellite imagery or aerial photography, and automatic vehicle location (AVL) data; integrating a Geographical Information System (GIS) with the one or more databases, one or more servers, an ERP system, and an electronic display device, wherein the GIS comprises a GIS map and a processing system; processing data, by the processing system, from: the one or more databases, the one or more servers, and remote sensing with Unmanned Aerial Vehicles (UAVs) and drones; and displaying the GIS map on the electronic display device, wherein displaying the GIS map comprises: displaying the location of the incident on the GIS map, displaying a common operating visual to incident personnel as the incident unfolds, and displaying emergency vehicles near to the incident.

Other aspects and advantages of the claimed subject matter will be apparent from the following description and the appended claims.

DETAILED DESCRIPTION

Figure 1:
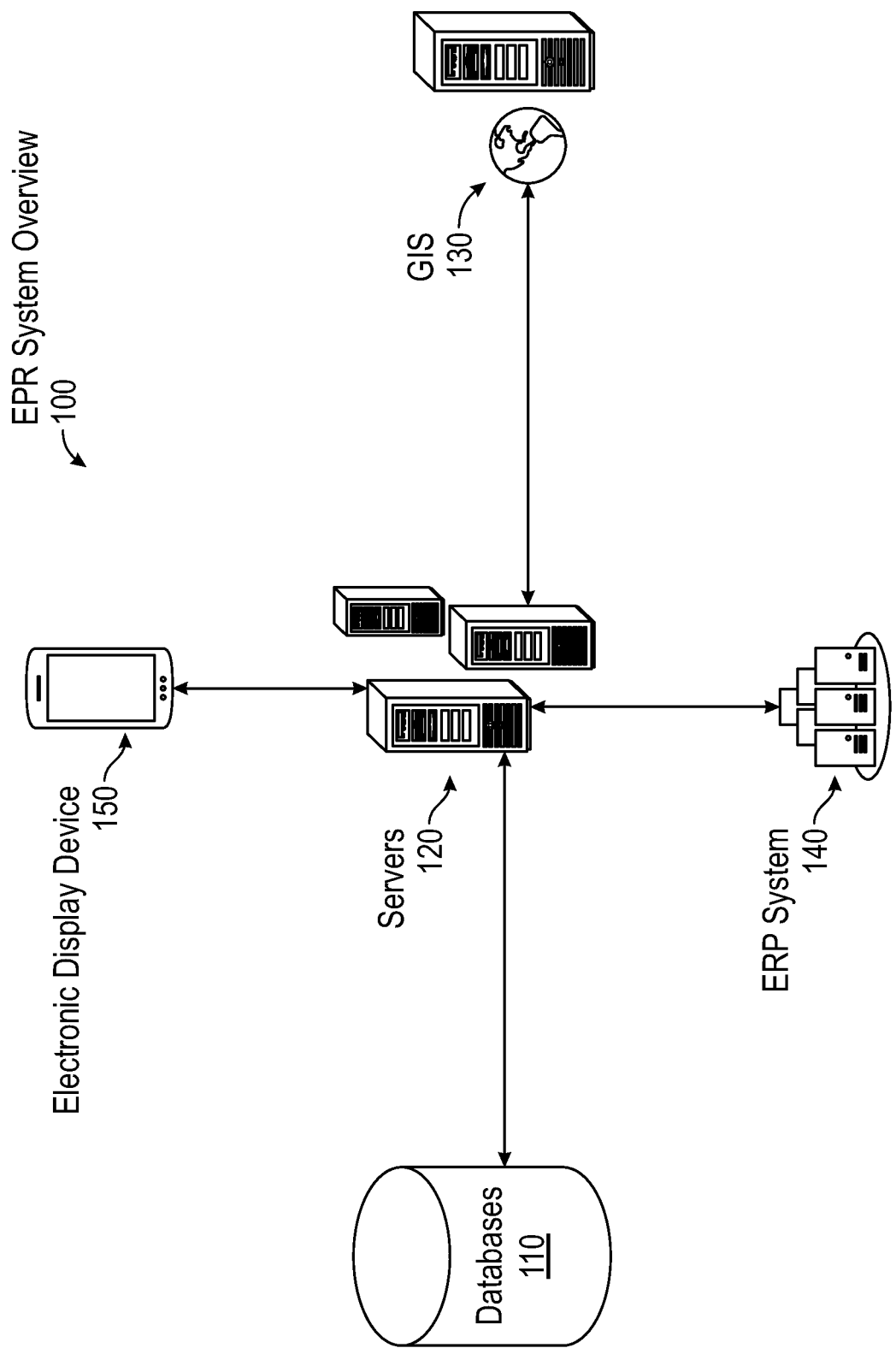
FIG. 1 shows an overview of an emergency planning and response (EPR) system for incidents related to the oil and gas industry in accordance with one or more embodiments of the disclosure.

Specific embodiments of the present disclosure will now be described in detail below with reference to the accompanying drawings. Like elements in the various figures are denoted by like reference numerals for consistency.

In the following detailed description of embodiments of the disclosure, numerous specific details are set forth to provide a more thorough understanding of the invention. However, it will be apparent to a person having ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (e.g., any noun in the application). The use of ordinal numbers is not intended to imply or create a particular ordering of the elements nor to limit any element to being only a single element unless expressly disclosed, such as using the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the disclosure provide a location-based system and method for emergency planning and response to an incident related to the oil and gas industry. Emergency planning involves activities necessary to analyze and record the possibility of the incident and the potential impacts on life (not just human life), property, and the environment. Emergency response involves activities following the incident to give emergency assistance to victims, to lessen the incident, and to speed recovery actions. Embodiments of the disclosure provide a visual of the incident on a geographic information system (GIS) map that can be accessed, shared, and visualized by all key stakeholders. During any incident (e.g., an event that compromises safety of personnel or equipment) related to the oil and gas industry, it is crucial to have the right data, at the right time, displayed logically, to respond and take the appropriate actions. A detailed description is subsequently provided in reference to the figures.

FIG. 1 shows a block diagram of an emergency planning and response (EPR) system for incidents related to the oil and gas industry in accordance with one or more embodiments of the disclosure. The EPR system 100 provides modules, as the incident unfolds, to visualize the incident, to find affected facilities around the incident, to locate nearest medical facilities to the incident, to find a suitable temporary incident command center and appropriates triage areas for the incident.

For incidents related to gas leaks in the pipeline network or gas well blowouts, the EPR system 100 provides tools to plan the safe evacuation of personnel working in and/or near the affected facilities based on the real-time weather information such as wind direction. The EPR system 100 also provides tools to generate a gas dispersion model based on specific parameters related to each gas well.

The EPR system 100 also helps safety operators to pro-actively detect and handle potential safety incidents early which is accomplished via color coded symbols on a GIS map with real-time readings from hydrogen sulfide (H2S) gas sensors, lower explosive limit (LEL) gas sensors, critical valves, and corrosion pumps.

In one or more embodiments, the EPR system 100 integrates many critical databases and stand-alone systems into one user-friendly interface using GIS technology. The EPR system 100 may be a unique and innovative solution developed within an oil and gas company to streamline decision making in emergencies. The EPR system 100 may be used by the emergency control centers in the oil and gas company and may be considered one of standard tools for the oil and gas company contingency plan. The EPR system 100 may be implemented within the oil and gas company as a corporate emergency responder tool (CERT). For example, a CERT application the electronic device 150 may allow the incident personnel to check the status of H2S gas sensors, LEL gas sensors, and critical valves, to determine the wind direction, and to generate gas dispersion models of wells, all on top of a rich geographical data platform. The CERT may be utilized at all the emergency control centers during drills and actual emergencies situations. The CERT provides a common view that significantly enhances situational awareness across the different emergency response organizations.

The EPR system 100, in one or more embodiments, includes one or more databases 110, one or more servers 120, a GIS 130, an enterprise resource planning (ERP) system 140, and an electronic display device 150. Each of these components is subsequently described.

The one or more databases 110 may store various data such as oil spills and trajectories models, real-time locations of ships and helicopters, H2S gas sensors, LEL gas sensors, and corrosion pumps real-time readings, real-time weather stations data, gas wells cross sections drawings and locations of daily drilling rigs, ERP, satellite imagery or aerial photography, and automatic vehicle location (AVL). For example, the one or more databases 110 may comprise a geodatabase, a well master database, and a weather data source. The one or more databases 110 may be any suitable data structure capable of storing information in an organized manner, such as a list, an array, a table, etc.

The one or more servers 120 may comprise an automatic identification system (AIS) server for locating ships in real-time, a helicopter location service server, a PI Tags server for H2S gas sensors, LEL gas sensors, and corrosion pumps real-time readings, WebLogic servers for application hosting infrastructure, and a proxy server for live video streams of cameras installed on the Unmanned Aerial Vehicles (UAVs), active directory servers, Internet Information Services (IIS), and domain name system (DNS) servers. The one or more servers 120 are operatively connected to the one or more databases 110.

The GIS 130 includes a GIS server that provides corporate map services and a GIS server that provides additional mapping services for basemaps, satellite imagery, and aerial photography. The GIS servers comprise a portal for the GIS 130, a GIS data store, and a GIS web adaptor. The GIS server is the main web services component to share maps and performs geospatial analysis over the internet. The portal for GIS 130 allows users within the company to share data, maps, and other geospatial content through the CERT application used in electronic device 150. The portal for GIS 130 is also a single management point for access and authorization. The GIS data store is an application that locally stores the portal's feature layer data, caches, and big data. The GIS web adaptor allows the company to expose the GIS servers through the company's standard website and port, permitting the company to easily share map services over the internet. The GIS web adaptor may be paired with IIS and active directory servers to provide a smooth method for authentication and access using integrated windows authentication (IWA). The GIS 130 is operatively connected to the one or more servers 120. For example, the GIS 130 may be operatively connected to the proxy server. A more detailed description of the GIS 130 is provided below in reference to, for example, FIG. 2.

The ERP system 140 effectively integrates islands of information (e.g., bodies of information that need to be shared but have no network connection) and structure systems to reflect best practices ensuring total transparency and real-time information sharing across the intra-organizational processes (e.g., major functional areas) as well as inter-organizational processes (e.g., security, environmental, exploration, drilling and producing organizations). The ERP system 140 is operatively connected to the one or more servers 120. For example, the ERP system 140 may be operatively connected to the WebLogic servers.

The electronic display device 150 may be any device capable of electronically processing and displaying information and generating graphic images and alphanumeric characters recognizable to the user. A non-limiting example of electronic display device 150 includes a desktop computer, a laptop computer, a netbook computer, an ultra-mobile personal computer (UMPC), a tablet computer, a personal digital assistant (PDA), a smartphone, or a wearable computer. The electronic display device 150 comprises a CERT application installed therein. The electronic display device 150 is operatively connected to the one or more servers 120. For example, the electronic display device 150 may be operatively connected to the proxy server and the WebLogic servers.

Figure 2:
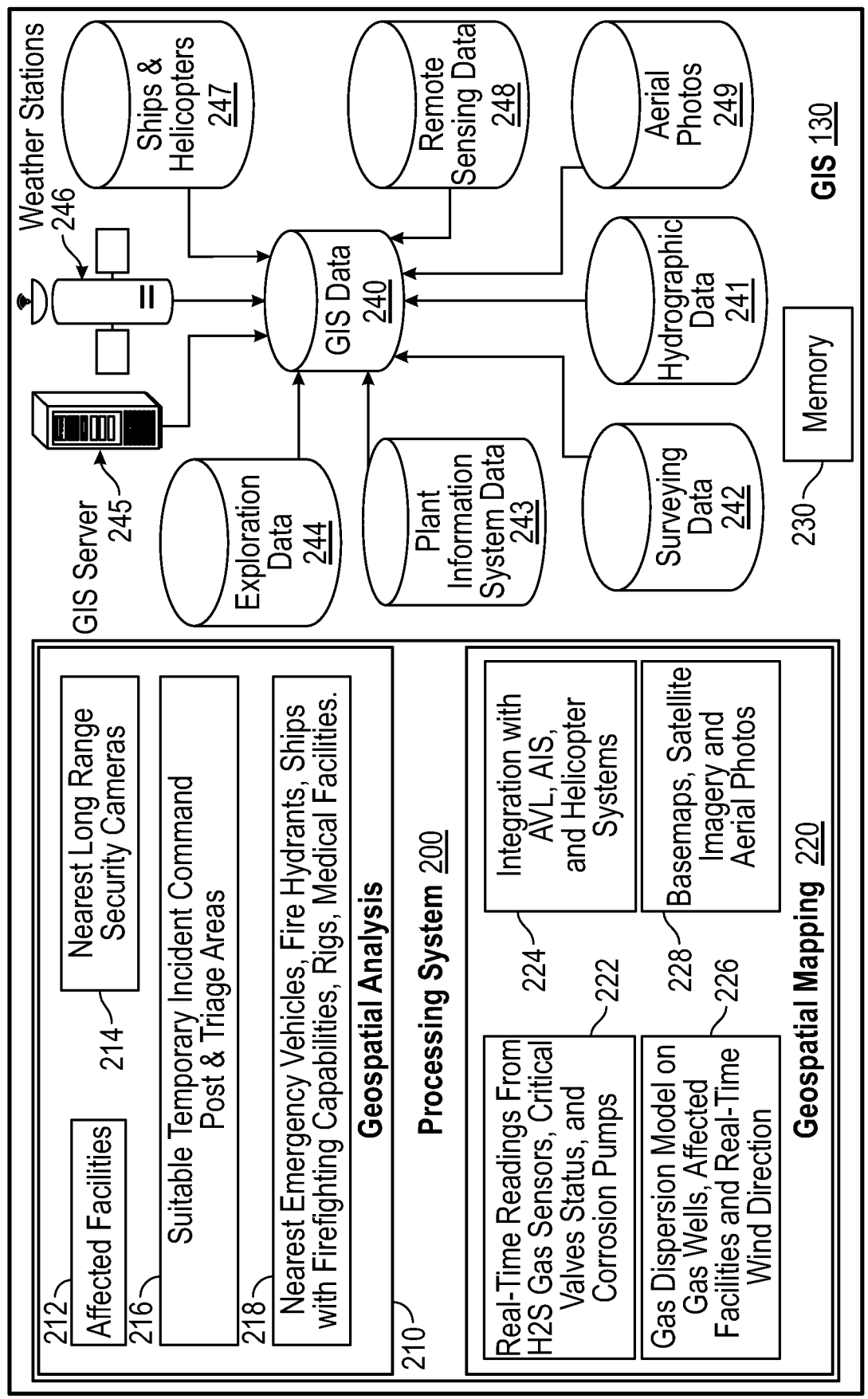
FIG. 2 shows a block diagram of a geographic information system (GIS) of the EPR system in accordance with one or more embodiments of the disclosure.

FIG. 2 shows a block diagram of a geographic information system (GIS) of the EPR system in accordance with one or more embodiments of the disclosure. The GIS 130 comprises a processing system 200, a memory 230, GIS data 240, and a GIS map displayed on the electronic display device 150. Each of these components is subsequently described.

The processing system 200 processes data from the one or more databases 110, the one or more servers 120, and remote sensing with Unmanned Aerial Vehicles (UAVs) and drones. The GIS data 240 comprise hydrographic data 241, surveying data 242, plant information system data 243, exploration data 244, GIS server data 245, real-time weather stations data 246, ships and helicopters' locations data 247, remote sensing data 248, and aerial photography data 249.

The processing system 200 performs geospatial analysis 210, as the incident gets unfolds, to identify and mark on the GIS map a location of the incident; to locate on the GIS map affected facilities 112 around the incident, nearest fire hydrants to the incident, nearest ships with firefighting capability to the incident, nearest rigs to the incident, suitable temporary incident command center, affected facilities around the incident, and appropriate triage areas; to search and locate, on the GIS map, long-range security cameras 214 installed nearest to the incident; and to provide access to stream videos, to the incident personnel using the electronic device 150, from the long-range security cameras 214 or cameras installed on the UAVs; to locate on the GIS map nearest suitable temporary incident command center and appropriate triage areas 216; to locate on the GIS map nearest emergency vehicles available to dispatch to the incident, nearest fire hydrants to the incident, nearest ships with firefighting capability to the incident, nearest rigs to the incident, and nearest medical facilities to the incident 218. For example, the emergency vehicles may comprise ambulances, fire trucks, police vehicles, and security vehicles. For example, the processing system 200 may be the GIS servers.

For example, when the incident is a gas leak in a pipeline network or a gas well blowout, performing geospatial analysis by the processing system 200 for the gas leak comprises processing real-time data from geo-referenced H2S gas sensors, LEL gas sensors, and corrosion pumps; checking real-time status of critical valves; and generating notifications regarding the location of the incident to nearest emergency control centers and the incident personnel. For example, the notifications may be in the form of a short message service (SMS), an email, or any combination thereof.

In another example, when the incident is an offshore oil spill, performing geospatial analysis by the processing system 200 for the offshore oil spill comprises searching and filtering, on the GIS map, vessels with oil spill response capabilities and vessels with fire-fighting or medical assistance capabilities near to the incident and dispatching them accordingly.

The processing system 200 also performs geospatial mapping 220, as the incident unfolds, to provide a visual of the incident on the GIS map to the incident personnel using the electronic device 150. The processing system is further configured to provide a shorter path and navigation assistance to emergency vehicles assigned to the incident; to visualize on the GIS map real-time locations of the helicopters and dispatch them as needed; and to display on the electronic device 150 all critical assets comprising pipelines, rigs, offshore platforms, wells, critical valves, major facilities, and security gates with satellite imagery or aerial photography in background.

Performing geospatial mapping by the processing system 200 includes displaying on the GIS map real-time readings from H2S gas sensors, LEL gas sensors, critical valves status, and corrosion pumps 222; integrating the GIS with AVL, AIS, and helicopters systems 224; generating gas dispersion model on gas wells, displaying the facilities affected by the incident and real-time wind direction 226; and providing basemaps, satellite imagery and aerial photos 228.

When the incident is a gas leak in a pipeline network or a gas well blowout, performing geospatial mapping by the processing system 200 for the gas leak comprises generating, on the GIS map, a gas dispersion model showing a highest impact area based on gas concentration levels; highlighting real-time status of critical valves in red, on the GIS map, where any two consecutive valves are failing; flashing in real-time H2S gas sensors and LEL gas sensors in red, on the GIS map, where the H2S gas sensors return abnormal high value readings or the LEL gas sensors detect high LEL gas denoting a potential gas leak; flashing in real-time pumps in red animation, on the GIS map, where two corrosion pumps are detected in running status in the gas well; displaying, on the GIS map, high-risk areas and zones near pipeline corridors; showing, on the GIS map, affected facilities around the incident and real-time wind direction; and displaying gas well cross section engineering drawings and work permits for the gas well or nearby facilities.

When the incident is an offshore oil spill, performing geospatial mapping by the processing system 200 for the offshore oil spill comprises displaying, to the incident personnel using the electronic device, oil spill locations and oil spill trajectory models generated overlaid on basemaps with the GIS map to the incident personnel.

The memory 230 may be the GIS data store that locally stores the portal's feature layer data, caches, and big data. The memory 230 may be persistent or non-persistent storage.

The GIS map is configured to display a common operating visual to incident personnel as it unfolds and to locate emergency vehicles nearest to the incident. For example, the incident personnel may be incident controllers, incident managers, emergency control center (ECC) staff, incident commanders, and other key stakeholders. The GIS map comprises color coded symbols with real-time readings obtained from H2S gas sensors, LEL gas sensors, critical valves, and corrosion pumps. The GIS map further comprises critical information regarding nearest emergency vehicles to the incident through the integration of the GIS with AVL, automatic identification system (AIS), helicopter location service, and work permit management solution.

Figure 3:
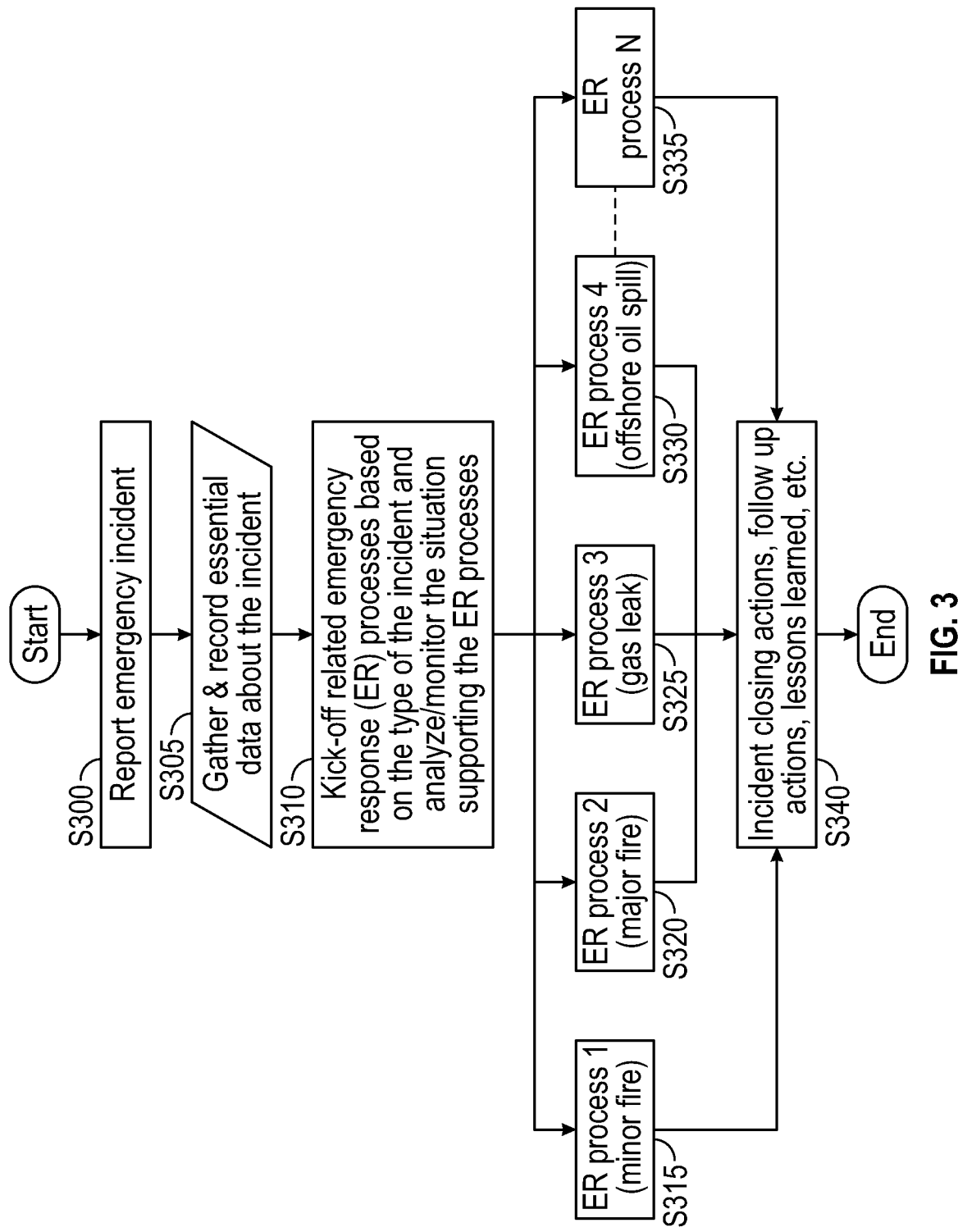
FIG. 3 shows a flowchart for a general process of the EPR for incidents related to the oil and gas industry in accordance with one or more embodiments of the disclosure.

FIG. 3 shows a flowchart for a general process of the EPR for incidents related to the oil and gas industry in accordance with one or more embodiments of the disclosure. The general process of the EPR may be performed on a computer system, as shown in FIG. 11.

In step S300, the incident is reported via a communication interface. For example, the communication interface may be a frequency modulated (FM) radio-based emergency communication service, a smartphone-based SOS system, an emergency message board system, etc. An FM radio provides several advantages such as longer propagation length and less susceptible to obstacles, making it suitable for broadcasting SOS messages. A smartphone-based SOS system allows a victim's smartphone to send out a distress signal. An emergency message board system may be activated to broadcast emergency messages.

In step S305, essential data about the incident is gathered and recorded. The appropriate data must be gathered to determine the size and scope of the incident, to respond and take the proper actions. For example, the essential data may comprise the location of the incident, the type of incident, affected facilities, etc.

In step S310, based on the type of incident, the emergency response (ER) processes are kicked-off utilizing the CERT. The incident may be analyzed and monitored to support the ER processes. GIS can display real-time incident early warnings. The weather stations can provide current weather indicators based on the location and surrounding areas of the incident. For example, wind information is crucial in predicting the movement of gas due to a gas leak in a pipeline network or a gas well blowout upon early report.

In steps S315-335, the ER processes are activated. The GIS may assist in dispatching emergency vehicles. For example, the closest (quickest) emergency vehicles may be selected, routed, and dispatched to the incident once the location is known. The ER Process 1 is activated when the incident is a minor fire. The ER Process 2 is activated when the incident is a major fire. The ER Process 3 is activated when the incident is a gas leak. The ER Process 4 is activated when the incident is an offshore oil spill. The ER Process N is activated when the incident is other than a minor fire, a major fire, a gas leak, or an offshore oil spill.

In step S340, the incident closing actions are taken after the short-term recovery activities to restore vital services and systems have been completed. The follow-up actions are taken for long-term recovery to restore all services to normal or better. The lessons learned during the incident are documented and may be used to improve the best practices of ER processes.

Figure 4:
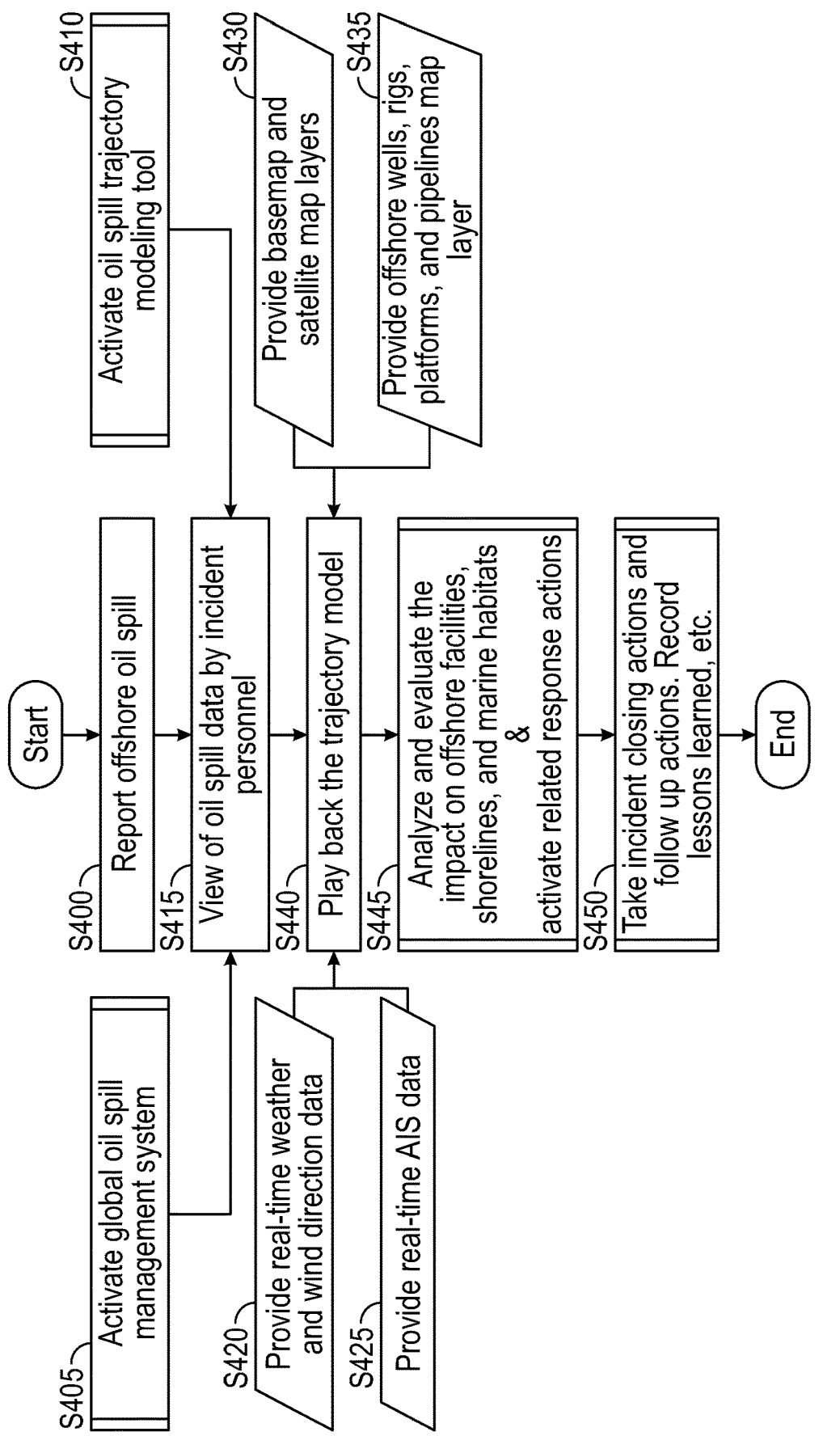
FIG. 4 shows a flowchart for a process of the EPR for an offshore oil spill in accordance with one or more embodiments of the disclosure.
Figure 11A:
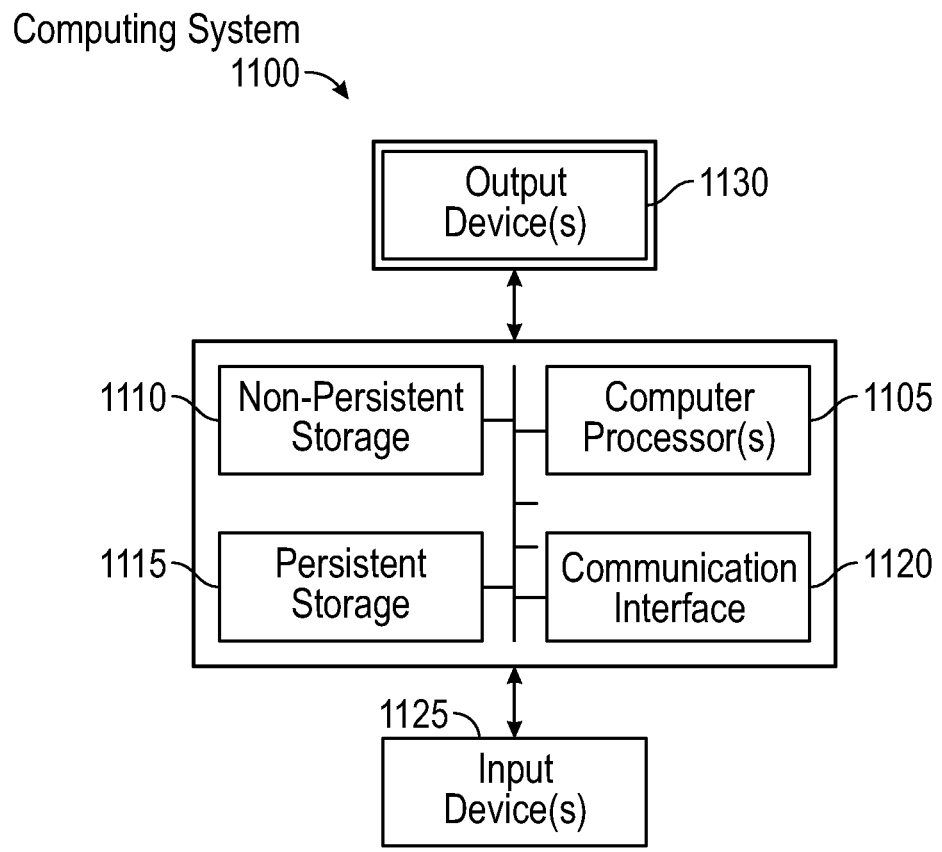
FIGS. 11A and 11B show a computing system in accordance with one or more embodiments of the disclosure.

FIG. 4 shows a flowchart for a process of the EPR for an offshore oil spill in accordance with one or more embodiments of the disclosure. The process of the EPR for an offshore oil spill may be performed on a computer system, as shown in FIG. 11A.

In step S400, an offshore oil spill incident is reported via the communication interface described above. For example, the emergency message board system may be activated to broadcast emergency messages to incident personnel related to the location of the offshore oil spill.

In step S405, a global oil spill management system (GOSMS) is activated. The GOSMS includes command and control modules, designed for managing and coordinating offshore oil spill responses.

In step S410, an oil spill trajectory modeling tool is activated to provide the best accurate oil spill trajectory to incident personnel. Oil spills can be modeled and displayed in the GIS 130. Modeling the oil spill trajectory allows predicting in advance the direction of the oil spilled, the time it will take to reach the shores, and assess the potential environmental impacts for the contaminated coastal areas.

In step S415, the incident personnel using the electronic display device 150 may view the oil spill data and trajectory model via an incident controller module of the GIS 130. For example, the incident commander, the incident controller, the ECC staff and other key stakeholders may view the oil spill data and trajectory model as the incident unfolds.

In step S420, real-time weather and wind direction data are provided by weather stations through the WebLogic servers. The accuracy of the simulation for the oil spill trajectory is related to geographic and meteorological data including real-time weather, wind direction, currents, and other processes which may move and spread oil spilled on the water.

In step S425, real-time AIS data for locating ships are provided through the AIS server. For example, through the integration of the GIS 130 with the AIS and related data processing, the GIS 130 provides the capability to search and filter ships near to the location of the incident with oil spill response capabilities and with fire-fighting or medical assistance capabilities.

In step S430, basemap and satellite map layers are provided through GIS server. For example, the GIS 130 provides the capability to display all critical assets with satellite imagery or aerial photography in the background.

In step S435, offshore wells, rigs, platforms, and pipeline layer are provided through the well master database. For example, the GIS 130 provides the capability to display pipelines, rigs, offshore platforms, and offshore wells with Satellite imagery or aerial photography in the background.

In step S440, the incident personnel using the electronic display device 150 may play back the oil spill trajectory model by incorporating the data gathered from steps S420, S425, S430, and S35. For example, the GIS 130 provides the capability to identify the likely path of the spread of the coastal oil spill based on currents and wind.

In step S445, an analysis and evaluation of environmental impacts for the contaminated offshore facilities, shorelines, and marine habitats are performed. The oil spilled will normally break up and be dissipated or scattered into the marine environment over time through the weathering process. However, devastating environmental disasters may be caused if inappropriate response actions are taken. Performing analysis and evaluation of environmental impacts allow to take response actions that stabilize the incident and reduce the probability of environmental disasters.

In step S450, the incident closing actions are taken after the short-term recovery activities to restore vital services and systems have been completed. The follow-up actions are taken for long-term recovery to restore all services to normal or better. The lessons learned during the incident are documented and may be used to improve the best practices of ER processes.

Figure 5:
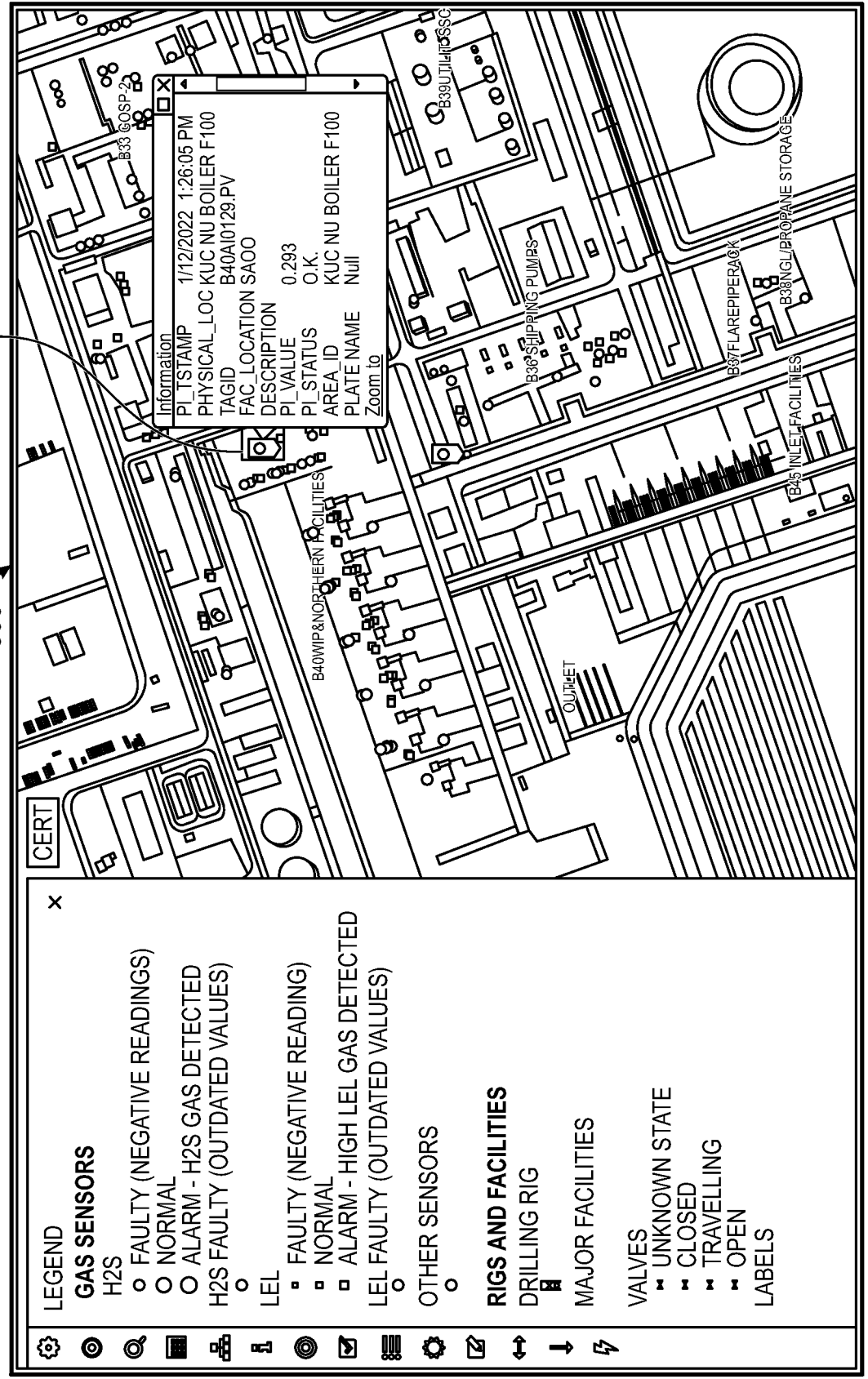
FIG. 5 shows an illustration of real-time readings of geo-referenced hydrogen sulfide (H2S) gas sensors and lower explosive limit (LEL) gas sensors via color coded symbols on a GIS map in accordance with one or more embodiments of the disclosure.

FIG. 5 shows an illustration of real-time readings of geo-referenced H2S gas sensors and LEL gas sensors via color coded symbols on a GIS map in accordance with one or more embodiments of the disclosure. The incident personnel may view, using the CERT application in the electronic device 150, real-time readings of geo-referenced H2S gas sensors and LEL gas sensors via color coded symbols on the GIS map 500, the location of the incident 505, drilling rigs, major facilities, status of critical valves. The status of the H2S gas sensors may be faulty (i.e., negative readings or outdated values), normal, or alarm (i.e., H2S gas detected). The status of the LEL gas sensors may be faulty (i.e., negative readings or outdated values), normal, or alarm (i.e., high LEL gas detected). The status of the valves may be unknown, closed, travelling, and open.

Figure 6:
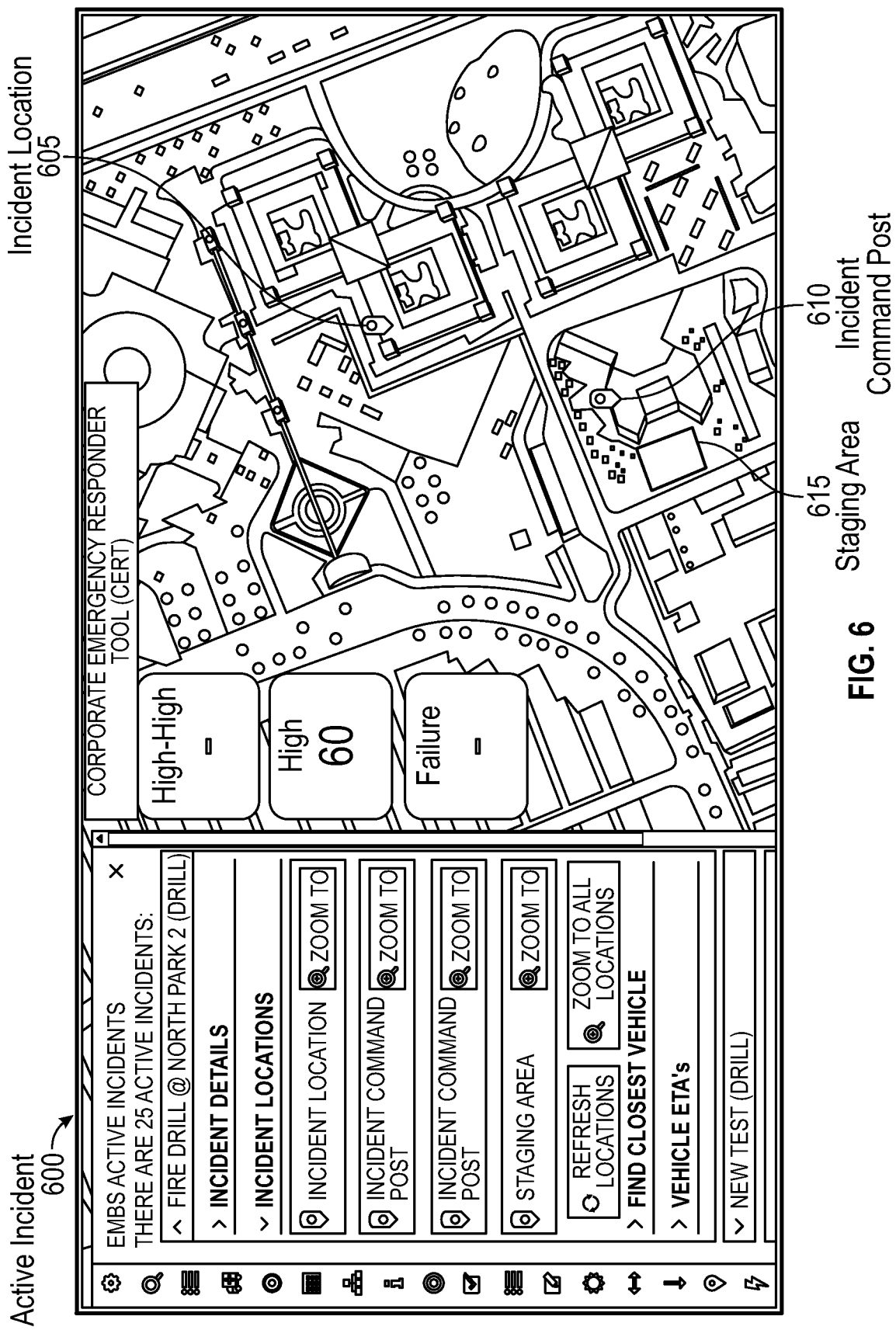
FIG. 6 shows an illustration of an active incident on a GIS map with a location of the incident, an incident command post, and a staging area setup to handle an incident related to the oil and gas industry in accordance with one or more embodiments of the disclosure.

FIG. 6 shows an illustration of an active incident on a GIS map with a location of the incident, an incident command post, and a staging area setup to handle an incident related to the oil and gas industry in accordance with one or more embodiments of the disclosure. The incident personnel may view, using the CERT application in the electronic device 150, the active incident on the GIS map 600 with the location of the incident 605, the incident command post 610, and the staging area 615. The GIS 130 provides the capability to zoom to the locations of the incident 605, the incident command post 610, and the staging area 615, to find the emergency vehicles near to the incident, and to determine the estimated time of arrival (ETA) for each vehicle assigned and dispatched to the incident.

Figure 7:
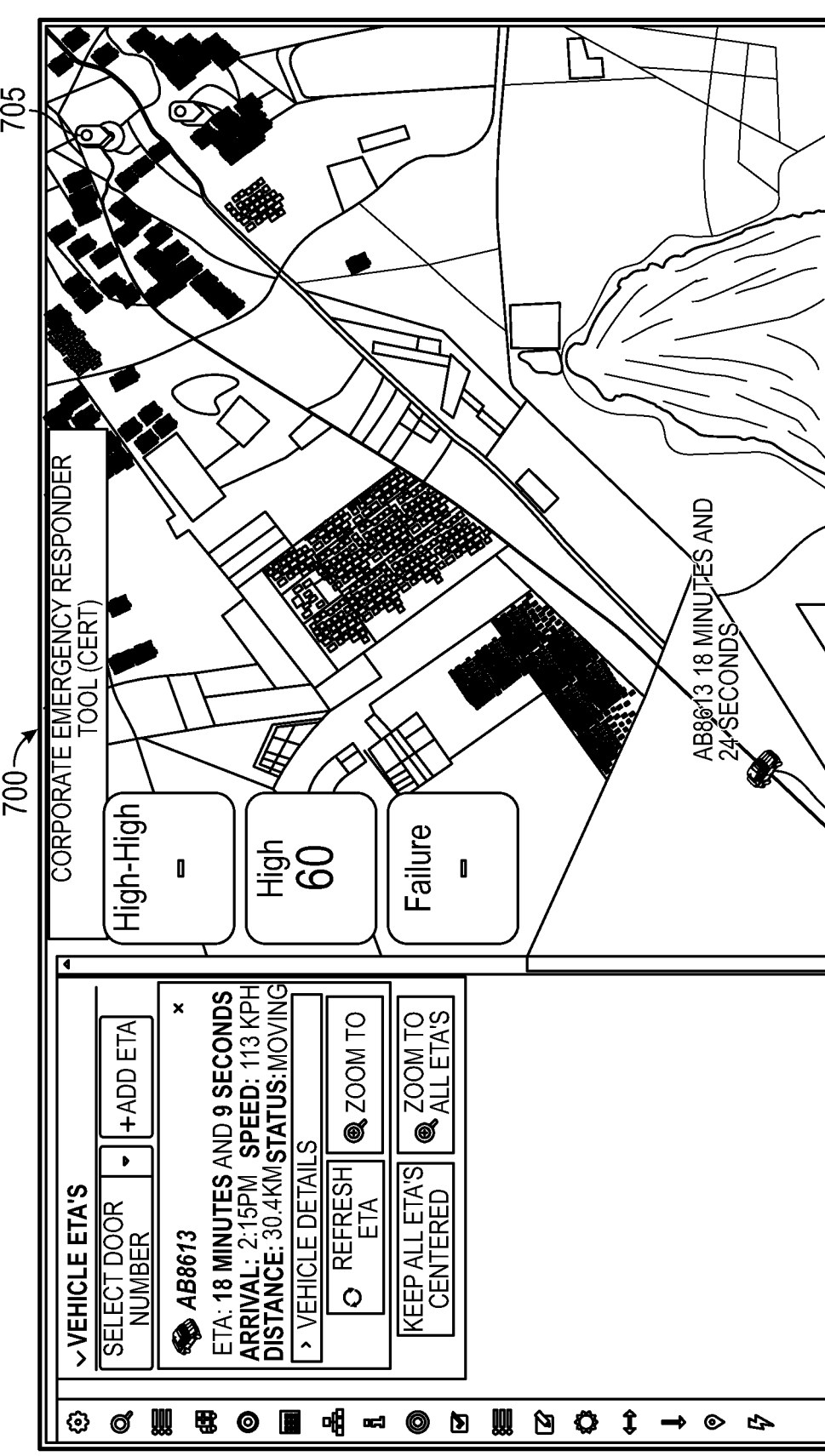
FIG. 7 shows an illustration of a vehicle, on a GIS map, assigned and dispatched during an emergency incident related to the oil and gas industry in accordance with one or more embodiments of the disclosure.

FIG. 7 shows an illustration of a vehicle, on a GIS map, assigned and dispatched during an emergency incident related to the oil and gas industry in accordance with one or more embodiments of the disclosure. The incident personnel may view, using the CERT application in the electronic device 150, the location of the incident 705, the assigned and dispatched vehicle 710 on the GIS map 700, the ETA 715, the vehicle 710's arrival time to the incident, the distance to the incident, the speed of the vehicle 710. The GIS 130 provides the capability to zoom to the ETA 715 and to keep the ETA 715 centered in the GIS map 700.

Figure 8:
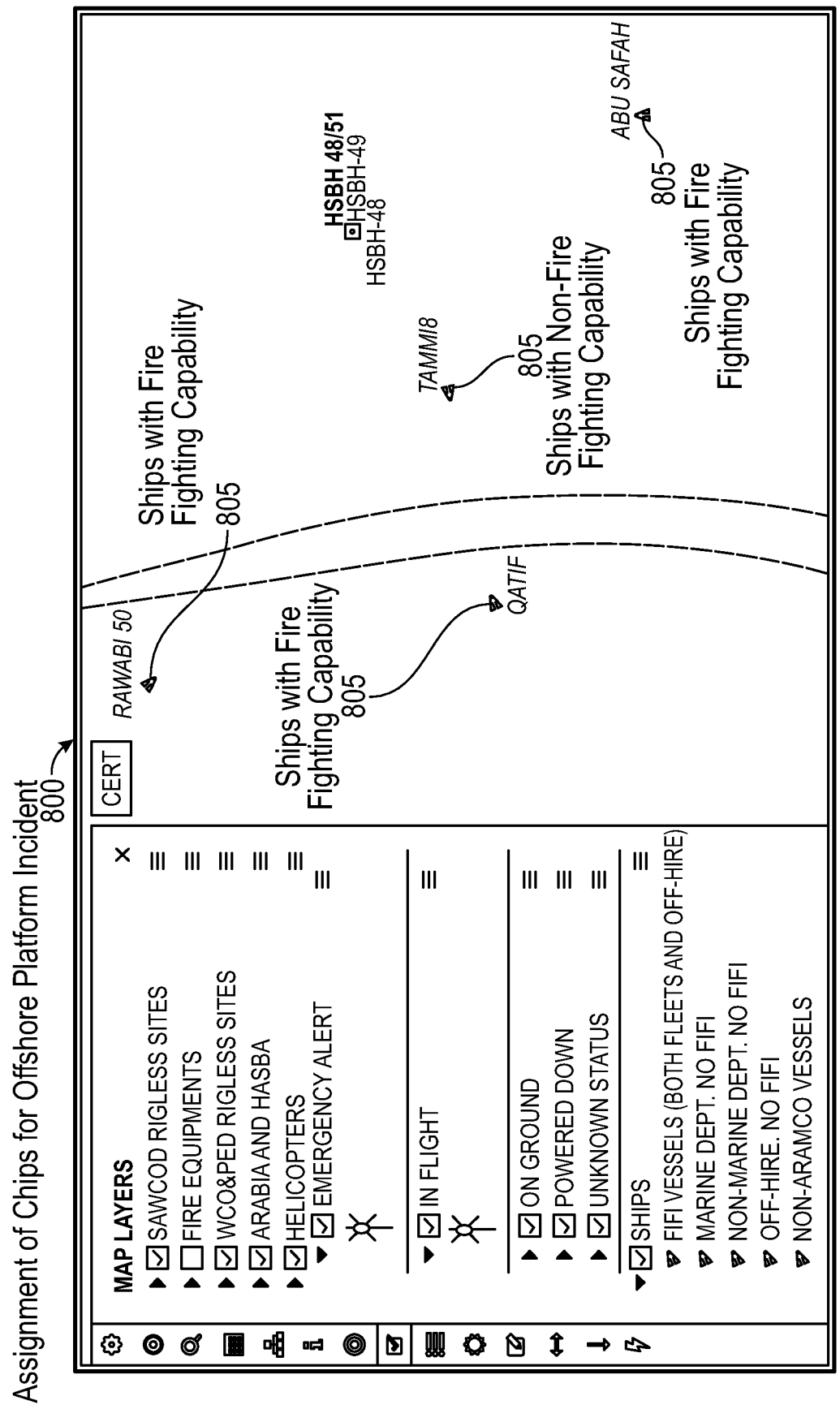
FIG. 8 shows an illustration of real-time locations of nearest ships with firefighting capability via color coded symbols on a GIS map to handle an offshore platform emergency incident in accordance with one or more embodiments of the disclosure.

FIG. 8 shows an illustration of real-time locations of nearest ships with firefighting capability via color coded symbols on a GIS map to handle an offshore platform emergency incident in accordance with one or more embodiments of the disclosure. The incident personnel may view, using the CERT application in the electronic device 150, the locations of the assigned and dispatched ships with firefighting capability 805 on the GIS map 800. The GIS 130 provides the capability to search and locate helicopters and ships. The GIS 130 provides the capability to display the status of the helicopters. The status of the helicopters may be on emergency alert, in flight, on ground, powered down, or unknow.

Figure 9:
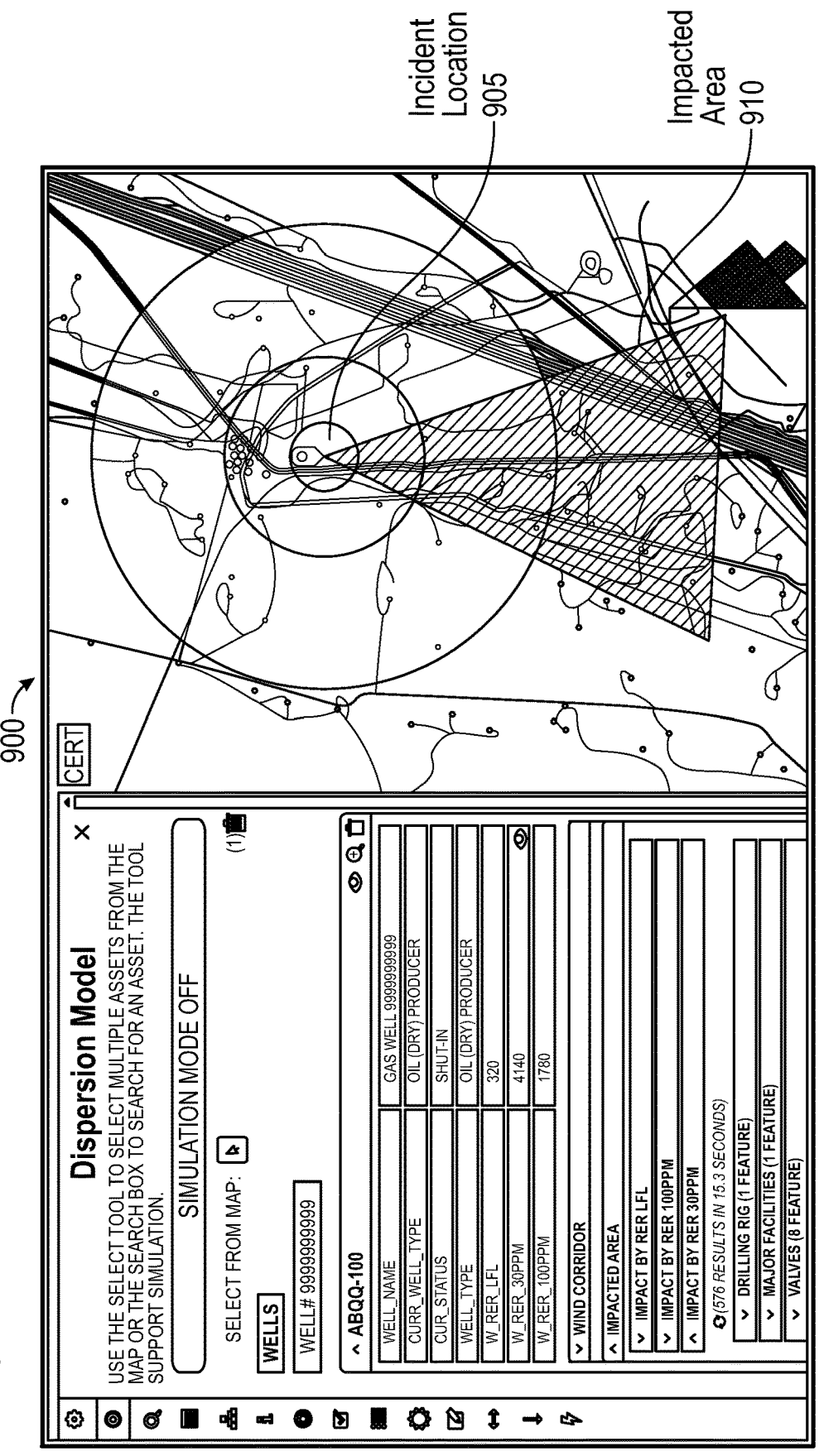
FIG. 9 shows an illustration of a gas dispersion model, on a GIS map, to handle a gas well emergency incident in accordance with one or more embodiments of the disclosure.

FIG. 9 shows an illustration of a gas dispersion model, on a GIS map, to handle a gas well emergency incident in accordance with one or more embodiments of the disclosure. The incident personnel may view, using the CERT application in the electronic device 150, the location of the incident 905 on the GIS map 900 and the impacted area 910. The GIS 130 provides the capability to display the wind corridor, the impacted area by the gas well rupture exposure radius (RER) lower flammable limit (LFL), the impacted area by the gas well RER 100 parts per million (PPM), the impacted area by the gas well RER 30 PPM, the drilling rigs, the major facilities, and the critical valves.

Figure 10:
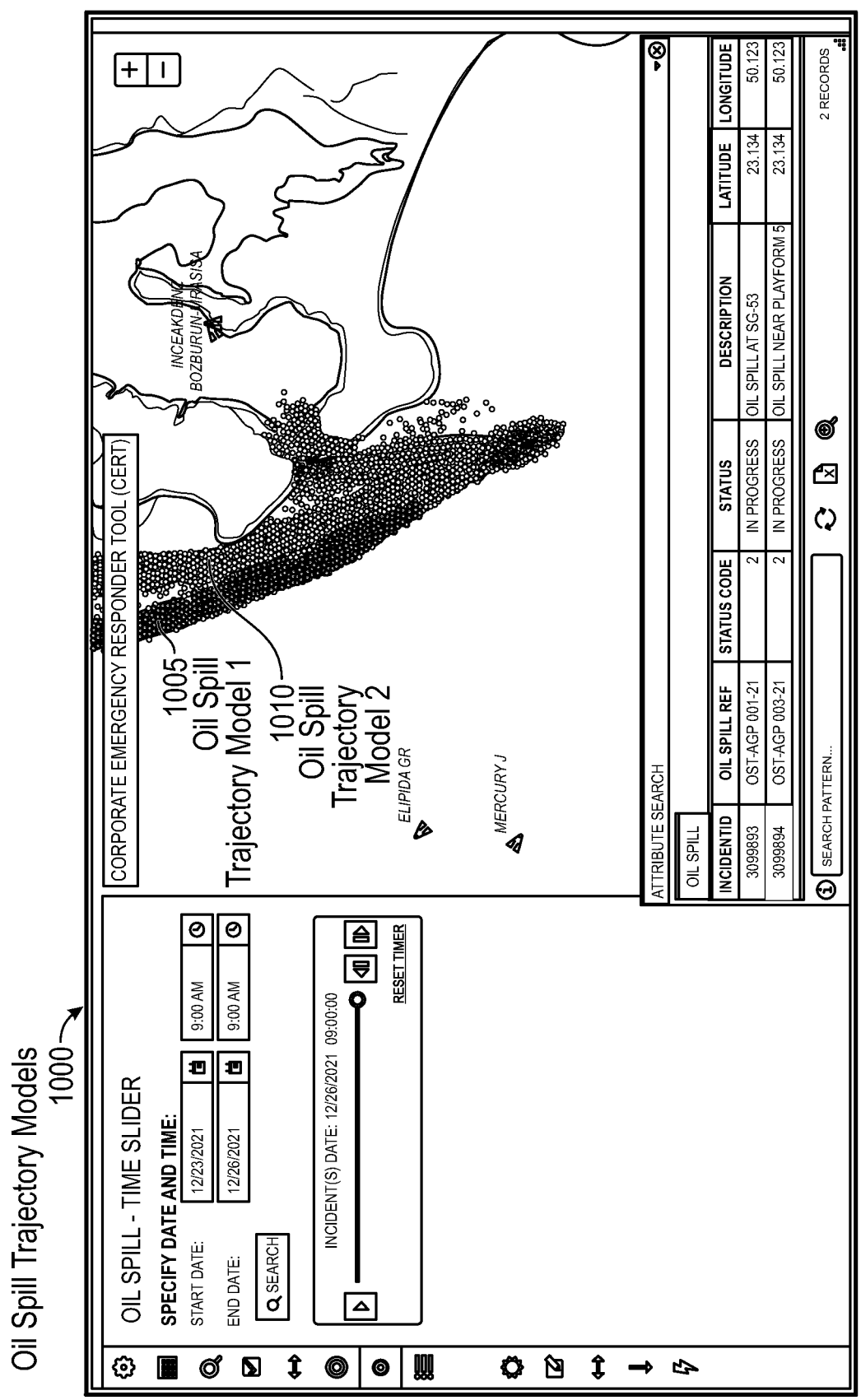
FIG. 10 shows an illustration of oil spill trajectory models, on a GIS map, to handle offshore oil spill emergency incident in accordance with one or more embodiments of the disclosure.

FIG. 10 shows an illustration of oil spill trajectory models, on a GIS map, to handle offshore oil spill emergency incident in accordance with one or more embodiments of the disclosure. The incident personnel may view, using the CERT application in the electronic device 150, the oil spill trajectory model 1005 and the oil spill trajectory model 1010 on the GIS map 1000. The GIS 130 provides the capability to display the longitude and latitude of the oil spill location, the description of the oil spill (e.g., near a specific platform), the status of the oil spill (e.g., in progress), the start date and time of the oil spill, and the end date and time of the oil spill. The GIS 130 also provides the capability to reset the time and replay the oil spill.

Figure 11B:
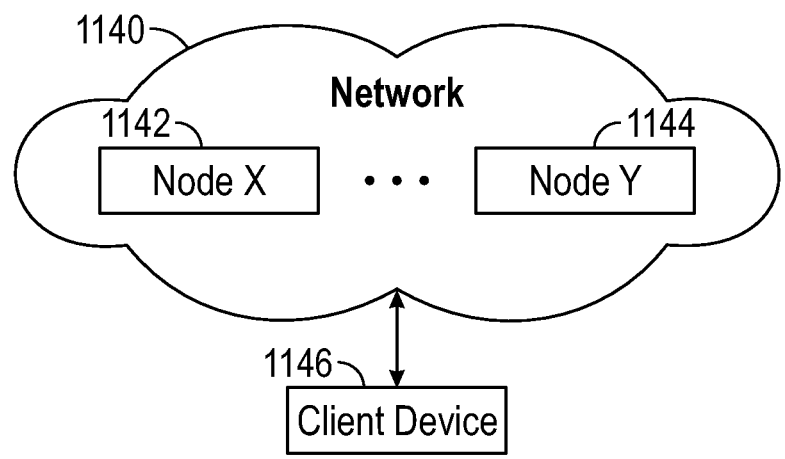

FIGS. 11A and 11B show a computing system in accordance with one or more embodiments of the disclosure. The process of the EPR for incidents related to the oil and gas industry may be performed on a computing system, as shown in FIGS. 11A and 11B. Any combination of mobile, desktop, server, router, switch, embedded device, or other types of hardware may be used. For example, the computing system 1100 may include one or more computer processor(s) 1105, a non-persistent storage 1110 (e.g., volatile memory, such as random access memory (RAM), cache memory), a persistent storage 1115 (e.g., a hard disk, an optical drive such as a compact disk (CD) drive or digital versatile disk (DVD) drive, a flash memory, etc.), a communication interface 1120 (e.g., Bluetooth interface, infrared interface, network interface, optical interface, etc.), and numerous other elements and functionalities.

The computer processor(s) 1105 may be an integrated circuit for processing instructions. For example, the computer processor(s) 1105 may be one or more cores or micro-cores of a processor. The computing system 1100 may also include one or more input device(s) 1125, such as a touchscreen, keyboard, mouse, microphone, touchpad, electronic pen, or any other type of input device.

The communication interface 1120 may include an integrated circuit for connecting the computing system 1100 to a network (not shown) (e.g., a local area network (LAN), a wide area network (WAN) such as the Internet, mobile network, or any other type of network) and/or to another device, such as another computing device.

The computing system 1100 may further includes one or more output device(s) 1130, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input device(s) 1125 and the output device(s) 1130 may be locally or remotely connected to the computer processor(s) 1105, the non-persistent storage 1110, and the persistent storage 1115. Many different types of computing systems exist, and the aforementioned input device(s) 1125 and output device(s) 1130 may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system 1100 in FIG. 11A may be connected to or be a part of a network. For example, as shown in FIG. 11B, the network 1140 may include multiple nodes (e.g., node X 1142, node Y 1144). Each node may correspond to a computing system, such as the computing system shown in FIG. 11A, or a group of nodes combined may correspond to the computing system shown in FIG. 11A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 1100 may be located at a remote location and connected to the other elements over a network.

Although not shown in FIG. 11B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 1142, node Y 1144) in the network 1140 may be configured to provide services for a client device 1146. For example, the nodes may be part of a cloud computing system. The nodes may include functionality to receive requests from the client device 1146 and transmit responses to the client device 1146. The client device 1146 may be a computing system, such as the computing system shown in FIG. 11A. Further, the client device 1146 may include and/or perform all or a portion of one or more embodiments of the disclosure.

The computing system or group of computing systems described in FIGS. 11A and 11B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may be executed on the same or different computing system.

Rather than or in addition to sharing data between processes, the computing system 1100 performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor(s) 1105. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system 1100, in performing one or more embodiments of the disclosure, may extract one or more data items from the obtained data. For example, the extraction may be performed as follows by the computing system 1100 in FIG. 11A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system 1100 of FIG. 11A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 11A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system 1100 of FIG. 11A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system 1100 of FIG. 11A and the nodes and/or client device 1146 in FIG. 11B. Other functions may be performed using one or more embodiments of the disclosure.

Embodiments of the present disclosure may provide at least one of the following advantages. Embodiments of the disclosure may provide a digitalization of the ERP and related decision-making support, give a common operating visual of the incident to the incident personnel as it unfolds, provide proximity analysis to find out the nearest AVL, emergency vehicles, fire hydrants, ships with fire-fighting capabilities, rigs, hospitals or other facilities, and help to handle both onshore and offshore emergencies using the same set of tools. Embodiments of the disclosure may help to visualize different real-time dataset that impacts decision making during an incident such as real-time wind direction, H2S gas sensor readings, critical valve status, location of moving assets (AVL, fire trucks, vessels/boats, company helicopters etc.).

Embodiments of the disclosure may provide the capability to display all critical assets such as pipelines, rigs, offshore platforms, wells, critical valves, major Facilities, security gates, etc. with satellite imagery or aerial photography in the background. Embodiments of the disclosure may provide the capability to search and locate long range security cameras installed near to the location of the incident and provide access to the video streams to the incident personnel assigned to the incident. This function can also stream videos from cameras installed on UAVs if the long-range security cameras are not installed near to the location of the incident and UAVs flights are approved. Embodiments of the disclosure may implement a device agnostic solution, providing easy access to the entire incident details as it occurs with live data feeds for the incident personnel using the electronic display device. Embodiments of the disclosure may display oil spill locations and oil spill trajectory models overlaid on a basemap with a common map view for the incident personnel.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A system for emergency planning and response to an incident related to oil and gas industry, the system comprising:
   one or more databases that store data of:
      oil spills and trajectories models,
      real-time locations of emergency vehicles,
      hydrogen sulfide ($H_2S$) gas sensors, lower explosive limit (LEL) gas sensors, and corrosion pumps real-time readings,
      real-time weather stations,
      gas wells cross sections drawings and locations of daily drilling rigs,
      enterprise resource planning (ERP),
      satellite imagery or aerial photography, and
      automatic vehicle location (AVL);
   one or more servers operatively connected to the one or more databases;
   an ERP system operatively connected to the one or more servers;
   an electronic display device operatively connected to the one or more servers; and
   a Geographical Information System (GIS) operatively connected to the one or more servers, the GIS comprising:
      a processing system, and
      a GIS map displayed by the electronic display device and configured to:
         display a common operating visual of the incident to incident personnel as it unfolds and
         locate the emergency vehicles near to the incident.

2. The system according to claim 1, wherein the processing system processes data from:
   the one or more databases,
   the one or more servers, and
   remote sensing with Unmanned Aerial Vehicles (UAVs) and drones.

3. The system according to claim 2, wherein the GIS map comprises color coded symbols with real-time readings obtained from:
   $H_2S$ gas sensors,
   LEL gas sensors,
   critical valves, and
   corrosion pumps.

4. The system according to claim 3, wherein the GIS map further comprises:
   critical information regarding nearest emergency vehicles to the incident through integration of the GIS with AVL, automatic identification system (AIS), helicopter location service, and work permit management solution.

5. The system according to claim 4, wherein the processing system performs geospatial analysis to:
   identify and mark, on the GIS map, a location of the incident;
   locate nearest emergency vehicles available to dispatch to the incident;
   locate on the GIS map:
      nearest medical facilities to the incident,
      nearest fire hydrants to the incident,
      nearest ships with firefighting capability to the incident,
      nearest ships with oil spill capability to the incident,
      nearest rigs to the incident,
      suitable temporary incident command center,
      affected facilities around the incident, and
      appropriate triage areas as the incident unfolds;
   search and locate, on the GIS map, long-range security cameras installed nearest to the incident; and
   provide access to stream video, to the incident personnel using the electronic device, from the long-range security cameras or cameras installed on the UAVs.

6. The system according to claim 4, wherein the processing system performs geospatial mapping to:
   provide a visual of the incident on the GIS map, to the incident personnel using the electronic device, as it unfolds;
   provide a shorter path and navigation assistance to emergency vehicles assigned to the incident;
   visualize real-time locations of the helicopters, on the GIS map, and dispatch them as needed; and
   display all critical assets, to the incident personnel using the electronic device, comprising pipelines, rigs, offshore platforms, wells, critical valves, major facilities, and security gates with satellite imagery or aerial photography in background.

7. The system according to claim 5, wherein the incident is a gas leak in a pipeline network or a gas well blowout, and wherein performing geospatial analysis for the gas leak comprises:
   processing real-time data from geo-referenced $H_2S$ gas sensors, LEL gas sensors, and corrosion pumps;
   checking real-time status of critical valves; and
   generating notifications regarding the location of the incident to nearest emergency control centers and the incident personnel.

8. The system according to claim 5, wherein the incident is an offshore oil spill, and wherein performing geospatial analysis for the offshore oil spill comprises:
 searching and filtering, on the GIS map, vessels with oil spill response capabilities and with fire-fighting or medical assistance capabilities near to the incident and dispatching them accordingly.

9. The system according to claim 6, wherein the incident is a gas leak in a pipeline network or a gas well blowout, and wherein performing geospatial mapping for the gas leak comprises:
 generating, on the GIS map, a gas dispersion model showing a highest impact area based on gas concentration levels;
 highlighting real-time status of critical valves in red, on the GIS map, where any two consecutive valves are failing;
 flashing in real-time $H_2S$ gas sensors or LEL gas sensors, in red on the GIS map, where the $H_2S$ gas sensors return abnormal high value readings or LEL gas sensors detect high LEL gas denoting a potential gas leak;
 flashing in real-time pumps in red animation, on the GIS map, where two corrosion pumps are detected in running status in the gas well;
 displaying, on the GIS map, high-risk areas and zones near pipeline corridors;
 showing, on the GIS map, affected facilities around the incident and a real-time wind direction; and
 displaying gas well cross section engineering drawings and work permits for the gas well or nearby facilities.

10. The system according to claim 6, wherein the incident is an offshore oil spill, and wherein performing geospatial mapping for the offshore oil spill comprises:
 displaying, to the incident personnel using the electronic device, oil spill locations and oil spill trajectory models generated overlaid on basemaps with the GIS map to the incident personnel.

11. A method for emergency planning and response to an incident related to oil and gas industry, the method comprising:
 reporting the incident via a communication interface;
 gathering essential data about the incident stored in one or more databases, wherein the essential data comprises:
  oil spills and oil spill trajectories,
  real-time locations of emergency vehicles,
  hydrogen sulfide ($H_2S$) gas sensors real-time readings,
  lower explosive limit (LEL) sensors real-time readings,
  corrosion pumps real-time readings,
  real-time weather stations data,
  gas wells cross sections drawings and locations of daily drilling rigs,
  enterprise resource planning (ERP) data,
  satellite imagery or aerial photography, and
  automatic vehicle location (AVL) data;
 integrating a Geographical Information System (GIS) with the one or more databases, one or more servers, an ERP system, and an electronic display device, wherein the GIS comprises a GIS map and a processing system;
 processing data, by the processing system, from:
  the one or more databases,
  the one or more servers, and
  remote sensing with Unmanned Aerial Vehicles (UAVs) and drones; and
 displaying the GIS map on the electronic display device, wherein displaying the GIS map comprises:
  displaying the location of the incident on the GIS map,
  displaying a common operating visual to incident personnel as the incident unfolds, and
  displaying emergency vehicles near to the incident.

12. The method according to claim 11, wherein displaying the GIS map on the electronic display device further comprises:
 displaying color coded symbols with real-time readings on the GIS map, wherein the real-time readings are obtained from:
  $H_2S$ gas sensors,
  LEL gas sensors,
  critical valves, and
  corrosion pumps.

13. The method according to claim 12, wherein displaying the GIS map on the electronic display device further comprises:
 displaying critical information regarding nearest emergency vehicles to the incident, as the incident unfolds, through integration of the GIS with AVL, automatic identification system (AIS), helicopter location service, and work permit management solution.

14. The method according to claim 13, wherein the system processing performs geospatial analysis and geospatial mapping.

15. The method according to claim 14, wherein performing geospatial analysis comprises:
 identifying and marking, on the GIS map, a location of the incident;
 locating nearest emergency vehicles available to dispatch to the incident;
 locating on the GIS map:
  nearest medical facilities to the incident,
  suitable temporary incident command center,
  nearest fire hydrants to the incident,
  nearest ships with firefighting capability to the incident,
  nearest ships with oil spill capability to the incident,
  nearest rigs to the incident,
  suitable temporary incident command center,
  affected facilities around the incident, and
  appropriate triage areas as the incident unfolds;
 searching and locating, on the GIS map, long-range security cameras installed nearest to the incident; and
 providing access to stream video, to the incident personnel using the electronic device, from the long-range security cameras or cameras installed on the UAVs.

16. The method according to claim 14, wherein performing geospatial mapping comprises:
 providing a visual of the incident on the GIS map, to the incident personnel using the electronic device, as it unfolds;
 providing a shorter path and navigation assistance to emergency vehicles assigned to the incident;
 visualizing real-time locations of the helicopters, on the GIS map, and dispatch them as needed; and
 displaying all critical assets, to the incident personnel using the electronic device, comprising pipelines, rigs, offshore platforms, wells, critical valves, major facilities, and security gates with satellite imagery or aerial photography in background.

17. The method according to claim 14, wherein the incident is a gas leak in pipeline network or a gas well blowout, and wherein performing geospatial analysis for the gas leak comprises:
 processing real-time data from geo-referenced $H_2S$ gas sensors, LEL gas sensors, and corrosion pumps;
 checking real-time status of critical valves; and generating notifications regarding the location of the incident to nearest emergency control centers and the incident personnel.

18. The method according to claim 16, wherein the incident is an offshore oil spill, and wherein performing geospatial analysis for the offshore oil spill comprises:
   searching and filtering vessels, on the GIS map, vessels with oil spill response capabilities and with fire-fighting or medical assistance capabilities near to the incident and dispatching them accordingly.

19. The method according to claim 16, wherein the incident is a gas leak in a pipeline network or a gas well blowout, and wherein performing geospatial mapping for the gas leak comprises:
   generating, on the GIS map, a gas dispersion model showing a highest impact area based on gas concentration levels;
   highlighting real-time status of critical valves in red, on the GIS map, where any two consecutive valves are failing;
   flashing in real-time $H_2S$ gas sensors and LEL gas sensors in red, on the GIS map, where the $H_2S$ gas sensors return abnormal high value readings or the LEL gas sensors detect high LEL gas denoting a potential gas leak;
   flashing in real-time pumps in red animation, on the GIS map, where two corrosion pumps are detected in running status in the gas well;
   displaying, on the GIS map, high-risk areas and zones near pipeline corridors;
   showing, on the GIS map, affected facilities around the incident and a real-time wind direction; and
   displaying gas well cross section engineering drawings and work permits for the gas well or nearby facilities.

20. The method according to claim 16, wherein the incident is an offshore oil spill, and wherein performing geospatial mapping for the offshore oil spill comprises:
   displaying, to the incident personnel using the electronic device, oil spill locations and oil spill trajectory models generated overlaid on basemaps with the GIS map to the incident personnel.

* * * * *